United States Patent [19]

Ravichandran et al.

[11] Patent Number: 5,037,867

[45] Date of Patent: Aug. 6, 1991

[54] STABILIZED COMPOSITIONS CONTAINING SUBSTITUTED ISOXAZOLIDINES

[75] Inventors: Ramanathan Ravichandran, Nanuet, N.Y.; Stephen D. Pastor, Danbury, Conn.

[73] Assignee: Ciba-Geigy Corporation, Ardsley, N.Y.

[21] Appl. No.: 508,393

[22] Filed: Apr. 12, 1990

[51] Int. Cl.$^5$ .................. C08K 5/3412; C08K 5/3417
[52] U.S. Cl. ........................................ 524/92; 524/95; 252/403
[58] Field of Search ..................... 252/403; 524/92, 95

[56] References Cited

U.S. PATENT DOCUMENTS

| | | | |
|---|---|---|---|
| 3,671,482 | 6/1972 | Fujimoto et al. | 524/95 |
| 3,960,816 | 6/1976 | Jurisch | 529/95 |
| 3,967,015 | 6/1976 | Hunsucker | 524/95 |
| 4,032,503 | 6/1977 | Kormány et al. | 529/95 |
| 4,205,176 | 5/1980 | Zestermann et al. | 524/95 |
| 4,256,620 | 3/1981 | Aigner et al. | 524/95 |
| 4,288,361 | 9/1981 | Zestermann et al. | 524/95 |

FOREIGN PATENT DOCUMENTS 0145957 11/1981 Japan ..................... 524/95

OTHER PUBLICATIONS

A. Padwa, "1,3-Dipolar Cycloaddition Chemistry", vol. 1-2, E. C. Taylor and A. Weissberger, Eds., Wiley-Interscience, N.Y., 1984 pp. 691-692.
C. A. vol. #95 114651e, p. 620, 1981.
C. A. 98:106453p, p. 530, 1983.
C. A. 100:51330y, p. 557, 1984.

Primary Examiner—Kriellion S. Morgan
Attorney, Agent, or Firm—Luther A. R. Hall

[57] ABSTRACT

Substituted isoxazolidines of formula I

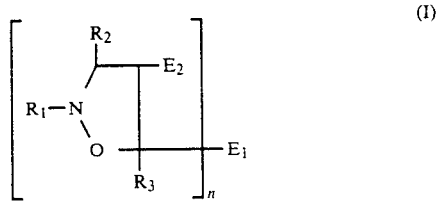

where $R_1$ and $R_2$ are independently alkyl, cycloalkyl, alkenyl, aryl or phenylalkyl, $R_2$ is additionally hydrogen, $R_3$ is hydrogen or methyl, n is 1-4, $E_1$ is an electron withdrawing group, and $E_2$ is hydrogen, alkyl, phenyl or has the same meaning as $E_1$, are effective in stablizing organic materials against oxidative, thermal and actinic degradation.

11 Claims, No Drawings

STABILIZED COMPOSITIONS CONTAINING SUBSTITUTED ISOXAZOLIDINES

The present invention pertains to selected substituted isoxazolidines which are useful as stabilizers in various organic compositions.

BACKGROUND OF THE INVENTION

While the synthesis of isoxazolidines by the 1,3-dipolar cycloaddition of selected ethylenically unsaturated compounds to nitrones or amine N-oxides is well known, the use of such substituted isoxazolidines as stabilizers for organic substrates has not been reported.

The synthesis of the isoxazolidines is reported in the extensive monograph of A. Padwa on "1,3-Dipolar Cycloaddition Chemistry", Vol 1-2, E. C. Taylor and A. Weissberger, Eds, Wiley-Interscience, New York, 1984.

OBJECT OF THE INVENTION

The object of the instant invention is to provide new stabilized organic compositions which contain an effective stabilizing amount of a substituted isoxazolidine of formula I.

DETAILED DISCLOSURE

The instant invention pertains to a stabilized organic composition which comprises (a) an organic material subject to oxidative, thermal or actinic degradation, and (b) an effective stabilizing amount of a substituted isoxazolidine of formula I

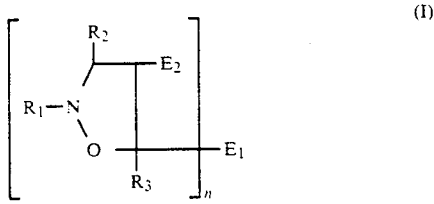

wherein
$R_1$ is alkyl of 1 to 36 carbon atoms, cycloalkyl of 5 to 12 carbon atoms, alkenyl of 3 to 18 carbon atoms, aryl of 6 to 10 carbon atoms, said aryl substituted by one or two alkyl groups of 1 to 8 carbon atoms; or phenylalkyl of 7 to 15 carbon atoms, $R_2$ is hydrogen or has the same meaning as $R_1$, $R_3$ is hydrogen or methyl, n is 1, 2, 3 or 4, when n is 1, $E_1$ is the group —COOR, —CON(R)$_2$, —CN, —SO—R, —SO$_2$—R, —PO(OR)$_2$, —P(R)$_2$, —PO(R)$_2$ or —PO(R)(OR), where R has the same meaning as $R_1$ or when $E_1$ contains an S or P atom, R is also a group of formula II

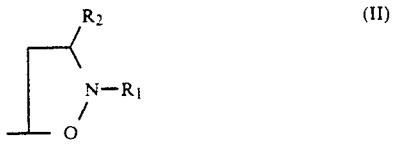

$E_2$ is hydrogen, alkyl of 1 to 4 carbon atoms or phenyl, or $E_2$ has the same meaning as $E_1$, or
$E_1$ and $E_2$ together are —CO—NR$_2$—CO—, and when n is 2 to 4, $E_2$ is hydrogen and $E_1$ is —COO]$_n$—R$_5$ or —CONH]$_n$—R$_5$, where R$_5$ is an n-valent alkylene of 2 to 10 carbon atoms or an n-valent arylene of 6 to 10 carbon atoms.

The preferred embodiments of the compounds of formula I are those where $R_1$ is alkyl of 1 to 18 carbon atoms, cycloalkyl of 5 to 7 carbon atoms, phenyl or phenyl substituted by alkyl of 1 to 4 carbon atoms; or benzyl; $R_2$ has the same preferred meaning as $R_1$; $R_3$ is hydrogen; n is 1 or 2; when n is 1, $E_2$ is hydrogen or has the same preferred meaning as $E_1$; $E_1$ is —COOR, —SO$_2$—R or —PO(OR)$_2$ where R has the same preferred meaning as $R_1$, or is the group of formula II; or $E_1$ and $E_2$ together are —CO—NR$_2$—CO— where R$_2$ has the same preferred meaning as $R_1$; and when n is 2, R$_5$ is preferably alkylene of 2 to 8 carbon atoms or o-, m- or p-phenylene.

The most preferred embodiments of the compounds of formula I are those where $R_1$ is alkyl of 12 to 18 carbon atoms or benzyl; $R_2$ is alkyl of 11 to 17 carbon atoms or phenyl; $R_3$ is hydrogen; n is 1 or 2; when n is 1, $E_2$ is hydrogen or —COOR where R is alkyl of 1 to 18 carbon atoms; $E_1$ is —COOR, —SO$_2$—R or —PO(OR)$_2$ where R is alkyl of 1 to 18 carbon atoms or is a group of formula II; or $E_1$ and $E_2$ together are —CO—NR$_2$—CO— where R$_2$ is phenyl; and when n is 2, $E_1$ is most preferably —COO]$_n$—R$_5$ where R$_5$ is alkylene of 2 to 6 carbon atoms.

When $R_1$, $R_2$, $R_3$, $E_1$ or R is alkyl, the alkyl depending on the carbon atom range cited for each group includes, for example, methyl, ethyl, isopropyl, n-butyl, sec-butyl, tert-butyl, tert-amyl, n-hexyl, 2-ethylhexyl, isooctyl, n-octyl, nonyl, decyl, undecyl, lauryl, tridecyl, tetradecyl, hexadecyl, heptadecyl, octadecyl, eicosyl and branched isomers thereof.

Cycloalkyl of 5 to 12 carbon atoms includes, for example, cyclopentyl, cyclohexyl, cycloheptyl, cyclooctyl and cyclododecyl.

Alkenyl of 3 to 18 carbon atoms includes, for example, allyl, 2-butenyl, linolenyl and oleyl.

When $R_1$, $R_2$ or R is phenyl substituted by alkyl, it is, for example, tolyl, xylyl, mesityl or ethylphenyl.

When $R_1$, $R_2$ or R is phenylalkyl, it is, for example, benzyl, phenethyl, α-methylbenzyl or β-methylphenethyl.

When R$_5$ is alkylene of 2 to 10 carbon atoms, it is, for example, ethylene, trimethylene, tetramethylene, pentamethylene, 2,2-dimethylpropan-1,3-diyl, hexamethylene, heptamethylene, octamethylene, decamethylene or 2,2-pentamethylenepropan-1,3-diyl.

When R$_5$ is arylene of 6 to 10 carbon atoms, it is, for example, phenylene, phenylene substituted by one or more alkyl of 1 to 4 carbon atoms; or naphthylene.

The compositions where component (a) is a synthetic polymer are especially part of this invention, and most particularly when the synthetic polymer is a polyolefin such as polypropylene.

The instant compounds are effective stabilizers for organic materials or compositions of matter comprising organic materials in that they reduce degradation resulting from long term oxidative and/or thermal aging and effectively protect said materials from actinic radiation.

In addition, the instant compounds show little tendency to evaporate from the organic compositions during thermal processing. Thus, loss of these compounds during such processing is negligible.

The instant compounds of formula I are conveniently prepared by a 1,3-cycloaddition reaction of an α-nitrone with an activated ethylenically unsaturated compound. The α-nitrones themselves are readily prepared by the controlled oxidation of a secondary amine with an alkyl hydroperoxide or by reaction of an aldehyde and a substituted hydroxylamine.

The starting materials for making the instant compounds are largely items of commerce, such hydrogenated tallow amine, and various ethylenically unsaturated monomers such as divinyl sulfone, diethyl vinylphosphonate, methyl acrylate, N-phenylmaleimide, dimethyl maleate, trimethylolpropane triacrylate and the like.

Substrates in which the compounds of this invention are particularly useful are polyolefins such as polyethylene and polypropylene; polystyrene, including especially impact polystyrene; ABS resin; elastomers such as e.g. butadiene rubber, EPM, EPDM, SBR and nitrile rubber.

In general polymers which can be stabilized include

1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under 1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate, vinylidene chloride/vinyl acetate copolymers, or vinyl fluoride/vinyl ether copolymers.

8. Polymers which are derived from α,β-unsaturated acids and derivatives thereof, such as polyacrylates and polymethacrylates, polyacrylamide and polyacrylonitrile.

9. Copolymers from the monomers mentioned under 8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl-butyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadienes with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide, poly-p-phenylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane] terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methyl cellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.

29. Aqueous emulsions of natural or synthetic rubber, e.g. natural latex or latices of carboxylated styrene/butadiene copolymers.

30. Polysiloxanes such as the soft, hydrophilic polysiloxanes described, for example, in U.S. Pat. No. 4,259,467; and the hard polyorganosiloxanes described, for example, in U.S. Pat. No. 4,355,147.

31. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.

32. Radiation curable compositions containing ethylenically unsaturated monomers or oligomers and a polyunsaturated aliphatic oligomer.

33. Epoxymelamine resins such as light-stable epoxy resins crosslinked by an epoxy functional coetherified high solids melamine resin such as LSE 4103 (Monsanto).

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. ANTIOXIDANTS 1.1. Alkylated monophenols, for example 2,6-di-tert-butyl-4-methylphenol
2-tert.butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroquinones, for example 2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,αdimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl]terephthalate 1.5. Benzyl compounds, for example 1,3,5-tri-(3,5-di-tert-butyl-4-hydroxybenzyl)-2,4,6-trimethylbenzene
di-(3,5-di-tert-butyl-4-hydroxybenzyl)sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl)isocyanurate
1,3,5-tris-(4-tert-butyl-3-hydroxy-2,6-dimethylbenzyl)isocyanurate 3,5-di-tert-butyl-4-hydroxybenzyl-phosphoric acid dioctadecyl ester 3,5-di-tert-butyl-4-hydroxybenzyl-phosphoric acid monoethyl ester, calcium-salt

1.6. Acylaminophenols, for example 4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate

1.7. Esters of
β-(3,5-di-tert-butyl-4-hydroxyphenyl)propionic acid with monohydric or polyhydric alcohols, for example

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.8. Esters of
β-(5-tert-butyl-4-hydroxy-3-methylphenyl)propionic acid with monohydric or polyhydric alcohols, for example

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.9. Amides of
β-(3,5-di-tert-butyl-4-hydroxyphenyl)propionic acid for example N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine

2. UV ABSORBERS AND LIGHT STABILIZERS 2.1. 2-(2'-Hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl)-, 3'-tert-butyl-5'-(2-(omega-hydroxyocta-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids, for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example, bis-(2,2,6,6-tetramethylpiperidyl)sebacate, bis-(1,2,2,6,6-pentamethylpiperidyl)sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid, 1,1'(1,2-ethanediyl)-bis-(3,3,5,5-tetramethylpiperazinone).

2.7. Oxalic acid diamides, for example, 4,4'-dioctyloxyoxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy-as well as of o- and p-ethoxy-disubstituted oxanilides.

2.8. Hydroxyphenyl-s-triazines, for example, 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl]-6-(4-chlorophenyl)-s-triazine; 2,4-bis[2-hydroxy-4-(2-hydroxyethoxy)phenyl]-6-phenyl-s-triazine; 2,4-bis[2-hydroxy-4-(2-hydroxyethoxy)phenyl]-6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert-butylphenyl)-phosphite, di-isodecylpentaerythritol diphosphite, di-(2,4-di-tert-butylphenyl)pentaerythritol diphosphite, tristearylsorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glas fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

The following examples are presented for the purpose of illustration only and are not to be construed to limit the nature or scope of the instant invention in any manner whatsoever.

EXAMPLE 1

2-Benzyl-3-phenyl-5-diethoxyphosphinylisoxazolidine

A solution of 2.11 g (10 mmol) of N-benzylidenebenzylamine N-oxide and 1.64 g (10 mmol) of diethyl vinylphosphonate in 30 ml of toluene under a nitrogen blanket is heated at reflux temperature for 5 days. The solvent is removed under reduced pressure to give 4.45 g of crude product which is then purified by preparative HPLC (Waters Prep 500A, silica gel, 3:2 heptane:ethyl acetate eluent) to give 1.15 g (31% yield) of a caramel-colored liquid.

$^1$H NMR (CDCl$_3$) (200 MHz) δ1.05 (dt, 3H), 1.09 (dt, 3H), 2.43 (m, 1H), 3.07 (m, 1H), 4.09 (complex multiplet, 10H). $^{31}$P NMR (C$_6$D$_6$) δ22.7.

Analysis: Calcd for C$_{20}$H$_{26}$NO$_4$P: C, 64.0; H. 7.0; N, 3.9. Found: C, 64.0; H, 7.2; N, 3.8.

EXAMPLE 2

Di(2-benzyl-3-phenyl-isoxazolidin-5-yl)Sulfone

A solution of 2.11 g (10 mmol) of N-benzylidenebenzylamine N-oxide and 1.09 g (5 mmol) of divinyl sulfone in 30 ml of toluene under a nitrogen atmosphere is heated at reflux temperature for 8 hours. The solvent is removed under reduced pressure to give 4.1 g of crude product which is then purified by preparative HPLC (Waters Prep 500A, silica gel, 3:1 heptane:ethyl acetate eluent) to give 0.70 g (26% yield) of a yellow amorphous solid.

Mass spectrometry shows M/Z of 540.

Analysis: Calcd for C$_{32}$H$_{32}$N$_2$O$_4$S: C, 71.9; H, 6.1; N, 5.1. Found: C, 71.4; H, 6.3; N, 5.1.

EXAMPLE 3

2-Oxa-3-benzyl-4,7-diphenylbicyclo[3.3.0]octan-6,8-dione

A solution of 13.57 g (64.2 mmol) of N-benzylidenebenzylamine N-oxide and 11.11 g (64.2 mmol) of N-phenylmaleimide in 50 ml of toluene is heated at 95° C. for 8 hours and then at reflux for an additional 6 hours. The reaction mixture is concentrated under reduced pressure and the residue obtained is purified by preparative HPLC to afford 9.5 g of the title compound as a white solid melting at 170°-172° C.

Analysis: Calcd for C$_{24}$H$_{20}$N$_2$O$_3$: C, 75.0; H, 5.2; N, 7.3. Found: C, 74.9; H, 5.1; N, 7.2.

EXAMPLE 4

2-Benzyl-3-phenyl-5-methoxycarbonylisoxazolidine

A solution of 8.0 g (37.9 mmol) of N-benzylidenebenzylamine N-oxide and 6.69 g (77.7 mmol) of methyl acrylate in 20 ml of toluene is heated under reflux for 12 hours. The reaction mixture is evaporated under reduced pressure to give a pale yellow oil. Flash chromatography (silica gel, 2:1 heptane:ethyl acetate) affords 8.0 g of the title compound as a pale yellow oil.

Analysis: Calcd for C$_{18}$H$_{19}$N$_3$: C, 72.7; H, 6.5; N, 4.7. Found: C, 72.7; H, 6.5; N, 4.7.

EXAMPLE 5

1,6-Hexamethylene Bis(2-benzyl-3-phenyl-isoxazolidin-5-carboxylate)

The procedure of Example 4 is repeated using 4.00 g (18.9 mmol) of N-benzylidenebenzylamine N-oxide and 2.12 g (9.5 mmol) of 1,6-hexamethylene diacrylate in 25 ml of toluene. Purification by liquid chromatography of the crude product affords the title compound as a colorless oil.

Analysis: Calcd for C$_{40}$H$_{44}$N$_2$O$_6$: C, 74.0; H, 6.9; N, 4.3. Found: C, 74.2; H, 7.2; N, 4.3.

EXAMPLE 6

Unstabilized polypropylene powder (Himont Profax 6501) containing 0.1% calcium stearate is thoroughly solvent blended with 0.3% by weight of the instant compound. The blended materials are then milled on a two-roll mill at 182° C. for five minutes after which time the stabilized polypropylene is sheeted from the mill and allowed to cool. The polypropylene is then compression molded and stretched into films of 2 mil (0.05 mm) thickness. The films are then exposed in a forced draft oven at 115° C. The films are considered to have failed on showing the first signs of decomposition or embrittlement.

| Additive* | Hours till Embrittlement |
|---|---|
| None | 125 (average value) |
| Compound of Example 5 (0.3% by weight) | 210 |

*0.1% by weight of calcium stearate is present in each case.

What is claimed is:

1. A stabilized composition which comprises
   (a) a synthetic polymer subject to oxidative, thermal or actinic degradation, and
   (b) an effective stabilizing amount of a substituted isoxazolidine of formula I

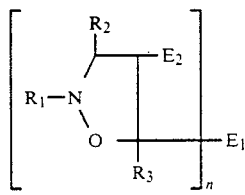

wherein
$R_1$ is alkyl of 1 to 36 carbon atoms, cycloalkyl of 5 to 12 carbon atoms, alkenyl of 3 to 18 carbon atoms, aryl of 6 to 10 carbon atoms, said aryl substituted by one or two alkyl groups of 1 to 8 carbon atoms, or phenylalkyl of 7 to 15 carbon atoms,
$R_2$ is hydrogen or has the same meaning as $R_1$,
$R_3$ is hydrogen or methyl,
n is 1, 2, 3 or 4,
when n is 1, $E_1$ is —COOR, —CON(R)$_2$, —CN, —SO—R, —SO$_2$—R, —PO(OR)$_2$, —P(R)$_2$, —PO(R)$_2$ or —PO(R)(OR), where R has the same meaning as $R_1$ or where when $E_1$ contains a S or P atom, R is also a group of formula II

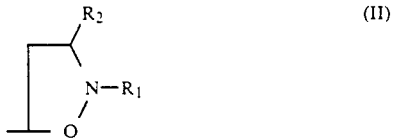

$E_2$ is hydrogen, alkyl of 1 to 4 carbon atoms or phenyl, or $E_2$ has the same meaning as $E_1$, or
$E_1$ and $E_2$ together are —CO—NR$_2$—CO—, and
when n is 2 to 4, $E_2$ is hydrogen and $E_1$ is —COO]$_n$—R$_5$ or —CONH]$_n$—R$_5$ where $R_5$ is an n-valent alkylene of 2 to 10 carbon atoms or when $R_5$ is an n-valent arylene of 6 to 10 carbon atoms.

2. A composition according to claim 1 wherein the synthetic polymer is a polyolefin.

3. A composition according to claim 2 wherein the polyolefin is polypropylene.

4. A composition according to claim 1 where in the compound of formula I of component (b)
$R_1$ is alkyl of 1 to 18 carbon atoms, cycloalkyl of 5 to 7 carbon atoms, phenyl, phenyl substituted by alkyl of 1 to 4 carbon atoms; or benzyl,
$R_2$ has the same preferred meaning as $R_1$,
$R_3$ is hydrogen,
n is 1 or 2,
when n is 1, $E_2$ is hydrogen or has the same meaning as $E_1$,
$E_1$ is —COOR, —SO$_2$—R or —PO(OR)$_2$ where R has the same preferred meaning as $R_1$ or is a group of formula II, or
$E_1$ and $E_2$ together are —CO—NR$_2$—CO— where $R_2$ has the same preferred definition as $R_1$, and
when n is 2 to 4, $R_5$ is alkylene of 2 to 8 carbon atoms or is o-, m- or p-phenylene.

5. A composition according to claim 4 wherein $R_1$ is alkyl of 12 to 18 carbon atoms or benzyl; $R_2$ is alkyl of 11 to 17 carbon atoms or phenyl; when n is 1, $E_2$ is hydrogen or —COOR where R is alkyl of 1 to 18 carbon atoms; $E_1$ is —COOR, —SO$_2$—R or —PO(OR)$_2$ where R is alkyl of 1 to 18 carbon atoms or is a group of formula II; or $E_1$ and $E_2$ together are —CO—NR$_2$—CO— where $R_2$ is phenyl; and when n is 2, $E_1$ is —COO]$_n$—R$_5$ where $R_5$ is alkylene of 2 to 6 carbon atoms.

6. A composition according to claim 1 wherein the compound of formula I is 2-benzyl-2-phenyl-5-diethoxyphosphinylisoxazolidine.

7. A composition according to claim 1 wherein the compound of formula I is bis(2-benzyl-3-phenyl-isoxazolidin-5-yl)sulfone.

8. A composition according to claim 1 wherein the compound of formula I is 2-oxa-3-benzyl-4,7-diphenyl-bicyclo[3.3.0]octan-6,8-dione.

9. A composition according to claim 1 wherein the compound of formula I is 2-benzyl-3-phenyl-5-methoxycarbonylisoxazolidine.

10. A composition according to claim 1 wherein the compound of formula I is 1,6-hexamethylene bis(2-benzyl-3-phenyl-isoxazolidin-5-carboxylate).

11. A composition according to claim 1 wherein the effective amount of component (b) is 0.01 to 5% by weight of the stabilized composition.

* * * * *